Patented Mar. 7, 1939

2,149,752

UNITED STATES PATENT OFFICE 2,149,752

PROCESS OF PRODUCING HIGH SATURATION OILS

Frederick Paul Vickery, Sacramento, Calif., assignor to California Spray-Chemical Corporation, Berkeley, Calif., a corporation of Delaware No Drawing. Application January 4, 1934,
Serial No. 705,239

9 Claims. (Cl. 196—13)

This invention relates to a process by which mineral or petroleum oils, or their distillates, are treated with a selective solvent to produce oils of higher saturation than that of the untreated oil. By this invention petroleum oils are produced which contain a higher proportion of saturated compounds. These oils are especially useful for phytonomic purposes and for lubricating, toilet and other uses in which excessive proportions of unsaturated organic constituents cause a deleterious effect.

By this invention oils of higher saturation are produced from petroleum oils, or their distillates, by a selective solvent whose selectivity has been improved by the addition of an organic compound that contains two hydroxyl groups. When such an hydroxylated compound is mixed with the selective solvent, in certain proportions, and the mixture is used in treating a mineral oil, an excellent volume of raffinate is obtained which has a high saturation.

In extracting the unsaturated constituents from petroleum oils, it has heretofore been customary to use sulphuric acid or sulphur dioxide. When sulphuric acid is used for this purpose, a portion of the acid is consumed, organic material of potential value is destroyed, and a sludge is formed which is difficult and obnoxious to handle. When sulphur dioxide is used, the operation is conducted under pressure in expensive apparatus. In either case it is essential that the last traces of the chemicals that are used for treating the oil be removed before the oil is marketable.

Instead of employing either of these powerful inorganic agents I use in the practice of this invention an organic selective solvent to which has been added a moderate proportion of an organic compound which contains two hydroxyl radicals. The organic selective solvent which I propose to use in the mixture would extract too great a proportion of oil to be economical, if it were used alone. Therefore I add to the selective solvent a compound containing two hydroxyl radicals. An amount of this compound is added, which up to certain experimental limits, greatly reduces the solubility of the saturates in the selective solvent and to a much less extent that of the unsaturates. Not only is the extraction of saturates reduced, but the yield of raffinate is accordingly notably increased. The organic compound containing the two hydroxyl radicals may be termed the "modifier".

In carrying out this invention the selective solvent used is acetone, and the organic compound having two hydroxyl radicals, or the modifier, is ethylene glycol. I find that when the selective solvent, acetone, is used alone it extracts too large a proportion of saturates to give an economical yield of raffinate, and I find that the modifier has practically no solubility for oil. I find, however, that when about ten percent of the volume of the solvent is ethylene glycol, that the saturation of the extract is good and that the efficiency, as measured by the product of the yield of raffinate in percent times the improvement in saturation in percent, is notably high. It is also found that when the proportion of ethylene glycol is increased to about thirty percent that the saturation of the extract is abnormally low. Glycol may be used in conjunction with other modifiers such as methanol.

The following are given as specific examples of carrying out the invention, but it is to be understood that the invention is not restricted to these specific examples or to the exact proportions or other conditions that are stated.

*Example 1.*—When 1000 volumes of a California oil containing 703 volumes of saturates and 297 volumes of unsaturates were treated with 4333 volumes of a solvent at about 22° C. composed of 90% acetone and 10% of ethylene glycol by volume, 390 volumes of oil were extracted. An equal volume of acetone alone would have extracted 705 volumes. The notably large yield of raffinate, together with a good saturation, makes the mixture more valuable than acetone alone. The following data which were obtained under the conditions mentioned above are expressed in terms of the volumes of raffinate recovered times the improvement in saturation in percent.

| | | | | | |
|---|---|---|---|---|---|
| Acetone | 100% | 95% | 90% | 80% | 70% |
| Ethylene glycol | 0 | 5% | 10% | 20% | 30% |
| Volume of raffinate times percent of improvement | 5015 | 7562 | 8501 | 8240 | 6555 |

*Example 2.*—When 1000 volumes of a California oil containing 703 volumes of saturates and 297 volumes of unsaturates are treated with 4333 volumes of a solvent at about 22° C. composed of 70% of acetone and 30% of ethylene glycol, 137 volumes of oil were extracted. This oil contained about 31 volumes of saturates and 106 volumes of unsaturates.

*Example 3.*—When 1000 volumes of a California oil containing 750 volumes of saturates and 250 volumes of unsaturates were treated at about 20° C. with 4333 volumes of a solvent composed of 56% of acetone, 14% of methanol and 30% of ethylene glycol, 120 volumes of oil were extracted. The extracted oil contained 46 volumes of saturates and 74 volumes of unsaturates.

Any one of four methods may be used in the treatment of petroleum oils or their distillates with acetone which has been modified by the addition of ethylene glycol: (1) the single treatment of batches, (2) the repeated treatment of batches, (3) the countercurrent batch treatment, and (4)

the countercurrent flow treatment. In all of them the oil is mixed with the modified acetone in a suitable device for about half a minute, and the mixture is conveyed to a settling tank, or equivalent device, where it divides into two layers; namely, the raffinate and the extract. These layers are then separated by decantation, or in any other suitable way. The raffinate contains the unextracted oil which is composed of a larger proportion of saturated oil and a smaller proportion of unsaturated than was present in the original oil, in addition to a small amount of dissolved solvent. The extract is composed of the major part of the solvent and the extracted oil which contains a greater proportion of unsaturated oil and a less proportion of saturated than was present in the original oil. In the method of repeated batch treatments, the raffinate is treated two or more times with fresh solvent. In the countercurrent methods the oil advances from treatment to treatment and first meets nearly spent solvent, and then progressively fresher solvent, until fresh solvent is used in the final treatment. In all cases the solvent may be recovered from the highly saturated oil of the final raffinate and the less saturated oils of the extract by a suitable method, such as distillation, for example, and used again in the process. After the acetone has been recovered from the extract liquors by distillation the ethylene glycol may be separated from the oil by decantation or other suitable methods. The raffinates are filtered to clarify the oil and remove the coloring matter. The extracts are treated as their disposition demands.

The most advantageous removal of the unsaturated constituents of the oil is obtained by a careful regulation of proportion between the acetone and the ethylene glycol. As already explained, a mixture of approximately ninety volumes of acetone and ten of ethylene glycol produces a good extraction of unsaturates. However, variations from this proportion may be necessary under the different conditions that arise in plant operation. In the repeated batch treatment the proportion of acetone to ethylene glycol may need to be changed from batch to batch and in the countercurrent methods from stage to stage. When ethylene glycol is used in connection with other modifiers it may be added to the spent extract liquors to drive saturates out. The ethylene glycol may be added to the solvent alone or in solution in the solvent. Proportions of acetone to ethylene glycol ranging from 95 volumes of acetone and 5 of ethylene glycol to 70 volumes of acetone to 30 volumes of ethylene glycol have been found to be satisfactory.

The proportion of the volume of the solvent used in the treatment to that of the oil depends on the saturation of the raw oil, the saturation of the raffinate desired, and the method of extraction. In the single treatment more solvent is required than in the repeated batch treatment, and more in the latter than in the countercurrent methods. The amount used preferably varies from about one to twenty-four times the volume of the oil treated.

I claim:

1. The process of producing oils of high saturation, which comprises treating petroleum oils or their distillates with a mixture of acetone and a sufficient amount of ethylene glycol to reduce greatly the capacity of the acetone to dissolve saturates.

2. The process of producing oils of high saturation, which comprises treating petroleum oils or their distillates with a mixture of acetone, methanol and ethylene glycol, enough methanol and ethylene glycol being used to reduce greatly the capacity of the acetone to dissolve saturates.

3. The process of producing oils of high saturation, which comprises treating petroleum oils or their distillates with a mixture of acetone and ethylene glycol whose proportions vary from about 95 volumes of acetone and 5 of ethylene glycol to about 70 volumes of acetone and 30 of ethylene glycol.

4. The process of producing oils of high saturation, which comprises treating petroleum oils or their distillates with a mixture of acetone and ethylene glycol at a temperature between 0° C. and about 40° C., the amount of the ethylene glycol present being sufficient to reduce greatly the capacity of the acetone to dissolve saturates.

5. The process of producing oils of high saturation, which comprises treating petroleum oils or their distillates with a mixture of acetone and ethylene glycol for a period of about thirty seconds, the amount of the ethylene glycol present being sufficient to reduce greatly the capacity of the acetone to dissolve saturates.

6. The process of producing oils of high saturation, which comprises treating petroleum oils or their distillates with a mixture of acetone and ethylene glycol, the amount of the ethylene glycol present being sufficient to reduce greatly the capacity of the acetone to dissolve saturates, allowing the emulsion to settle into two layers, removing the raffinate, separating the contained solvent from the raffinate and filtering the raffinate.

7. The process of producing oils of high saturation, which comprises treating petroleum oils or their distillates with a mixture of acetone and ethylene glycol, the amount of the ethylene glycol present being sufficient to reduce greatly the capacity of the acetone to dissolve saturates, allowing the emulsion to settle into two layers, removing the extract and driving off the solvent from the oil.

8. The process of producing oils of high saturation, which comprises treating petroleum oils or their distillates with a mixture of acetone and ethylene glycol, the amount of the ethylene glycol present being sufficient to reduce greatly the capacity of the acetone to dissolve saturates, allowing the emulsion to settle, separating the raffinate, treating it repeatedly with the mixture of acetone and ethylene glycol, separating after each treatment, driving off the solvent contained in the last separated raffinate, and filtering.

9. The process of producing oils of high saturation, which comprises treating petroleum oils or their distillates with a mixture of acetone and ethylene glycol in a counter-current system, the amount of the ethylene glycol present being sufficient to reduce greatly the capacity of the acetone to dissolve saturates, allowing the emulsion to settle, removing the raffinate, driving off the solvent and filtering.

FREDERICK PAUL VICKERY.